(12) United States Patent
Liu et al.

(10) Patent No.: US 11,202,506 B2
(45) Date of Patent: Dec. 21, 2021

(54) SUPPORT FRAME

(71) Applicant: ZHENGZHOU YUNHAI INFORMATION TECHNOLOGY CO., LTD., Henan (CN)

(72) Inventors: Guangkai Liu, Henan (CN); Hailong Zhang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 39 days.

(21) Appl. No.: 16/097,157

(22) PCT Filed: Nov. 30, 2017

(86) PCT No.: PCT/CN2017/113704
§ 371 (c)(1),
(2) Date: Oct. 26, 2018

(87) PCT Pub. No.: WO2019/041601
PCT Pub. Date: Mar. 7, 2019

(65) Prior Publication Data
US 2021/0219718 A1  Jul. 22, 2021

(30) Foreign Application Priority Data

Aug. 31, 2017 (CN) .......................... 201710773568.0

(51) Int. Cl.
*A47B 96/07* (2006.01)
*A47B 49/00* (2006.01)

(52) U.S. Cl.
CPC ............ *A47B 96/07* (2013.01); *A47B 49/004* (2013.01)

(58) Field of Classification Search
CPC .............. A47B 96/07; A47B 2097/005; A47B 21/0314; A47B 23/04; A47B 2023/049;
(Continued)

(56) References Cited

U.S. PATENT DOCUMENTS 721,944 A * 3/1903 Douglas ................. F16M 11/12
248/278.1
1,247,449 A * 11/1917 Postles ................... F16M 11/12
248/278.1
(Continued)

FOREIGN PATENT DOCUMENTS

CN   201757257 U   3/2011
CN   103791205 A   5/2014
(Continued)

OTHER PUBLICATIONS

International Search Report for PCT/CN2017/113704 dated May 23, 2018, ISA/CN.

*Primary Examiner* — Hiwot E Tefera
(74) *Attorney, Agent, or Firm* — Yue (Robert) Xu; Apex Attorneys at Law, LLP

(57) ABSTRACT

A support frame includes a column, a rocker arm, a tray, an adjustment shaft and a fixing block. The column is vertically arranged, the rocker arm is horizontally arranged, and the column and the rocker arm are connected by a hinge. The rocker arm includes a transverse support tube connected to the hinge, and the adjustment shaft is arranged inside the transverse support tube. An elastic member has one end connected to the adjustment shaft and another end connected to the column or the hinge. The transverse support tube is provided with multiple U-shaped grooves, and the fixing block is arranged outside the transverse support tube, and the tray is connected to the fixing block. The fixing block passes through the U-shaped groove to be connected to the adjustment shaft; or, a screw passes through the U-shaped groove, to connect the fixing block to the adjustment shaft.

8 Claims, 3 Drawing Sheets

(58) Field of Classification Search
CPC ..... A47B 23/042; A47B 97/04; A47B 49/004;
F16M 11/12; F16M 13/02; F16M 11/16;
F16M 11/121; F16M 2200/022; F16M
2200/024; F16M 2200/041; F16M 11/04;
F16M 11/18; F16M 11/10; F16M 11/08;
F16M 13/022; F16M 11/24; G06F 1/1618
USPC .................................. 248/274.1, 289.1, 240
See application file for complete search history.

(56) References Cited

U.S. PATENT DOCUMENTS

| | | | | |
|---|---|---|---|---|
| 1,797,847 | A * | 3/1931 | Vandagriff | A47B 23/02 108/49 |
| 1,894,991 | A * | 1/1933 | Hayes | A47B 23/02 108/8 |
| 2,483,758 | A * | 10/1949 | Douglas | A47B 96/07 248/242 |
| 5,630,566 | A * | 5/1997 | Case | A47B 23/046 248/122.1 |
| 5,918,841 | A * | 7/1999 | Sweere | F16M 13/00 248/123.11 |
| 5,971,512 | A * | 10/1999 | Swan | B25H 1/10 211/131.1 |
| 9,169,961 | B1 * | 10/2015 | Jiang | F16M 11/12 |
| 11,020,647 | B2 * | 6/2021 | Sierra Murillo | F16M 13/022 |
| 2003/0075653 | A1 | 4/2003 | Li | |
| 2009/0008849 | A1 * | 1/2009 | Cunningham | A47B 96/07 269/79 |
| 2010/0213151 | A1 * | 8/2010 | Theesfeld | F16M 11/24 211/151 |
| 2014/0027589 | A1 * | 1/2014 | Durgin | A47B 96/06 248/218.4 |
| 2015/0346774 | A1 * | 12/2015 | Marquardt | F21V 33/0048 362/253 |
| 2017/0009935 | A1 * | 1/2017 | Theis | F16M 13/022 |

FOREIGN PATENT DOCUMENTS

| | | |
|---|---|---|
| CN | 203770971 U | 8/2014 |
| CN | 204592740 U | 8/2015 |
| CN | 204785422 U | 11/2015 |
| CN | 107339570 A | 11/2017 |

* cited by examiner

SUPPORT FRAME

This application is the national phase of International Application No. PCT/CN2017/113704, titled "SUPPORT FRAME", filed on Nov. 30, 2017, which claims the benefit of priority to Chinese Patent Application No. 201710773568.0, titled "SUPPORT FRAME", filed with the State Intellectual Property Office of People's Republic of China on Aug. 31, 2017, the entire disclosures thereof are incorporated herein by reference.

FIELD

The present application relates to the technical field of auxiliary tools for electronic devices, and in particular to a support frame for a tablet type electronic product.

BACKGROUND

In scenes such as test platforms, laboratories, cabinets, it is often necessary to use tablet type electronic devices such as laptops in the daily test and maintenance work, but there is no location in the work site for placing the device, which causes considerable inconvenience for test and maintenance work.

SUMMARY

In view of the deficiencies in the conventional technology, a support frame is developed according to the present application, and the angle of this frame is adjustable. The support frame can be retracted to a relatively flat position without occupying excess space when it is not in use, and is very suitable for laboratories for performing signal integrity tests, system tests, software tests, power supply tests, etc., and may also be placed in large computer rooms for daily operation and maintenance.

The technical solution according to the present application for addressing the technical issues is as follows. In one aspect, a support frame is provided according to an embodiment of the present application, which includes a column, a rocker arm, a tray, an adjustment shaft and a fixing block. The column is vertically arranged, the rocker arm is horizontally arranged, and the column and the rocker arm are connected through a hinge. The rocker arm includes a transverse support tube. The transverse support tube is connected to the hinge, the transverse support tube is a hollow round tube, and the adjustment shaft is arranged inside the transverse support tube. An elastic member is provided at one end of the adjustment shaft, and the elastic member has one end connected to the adjustment shaft and another end connected to the column or the hinge. The transverse support tube is provided with multiple U-shaped grooves, and the fixing block is arranged outside the transverse support tube, and the tray is connected to the fixing block. The fixing block passes through the U-shaped groove to be connected to the adjustment shaft; or, the support frame further includes a screw, and the screw passes through the U-shaped groove, to connect the fixing block to the adjustment shaft. A tablet device such as a laptop can be placed on the tray, and the U-shaped groove of the transverse support tube provides two positions for the tray, that is, that is, one position when the device needs to be placed and another position where the tray is retracted to a relatively flat space when the device is not placed. By rotating the adjustment shaft, the fixing block or the screw connecting the fixing block to the adjustment shaft is engaged in different positions of the U-shaped groove, thus, the adjustment to the angle of the tray can be realized.

As an optimization, the elastic member is a spring, and the U-shaped groove is arranged in an axial direction of the adjustment shaft, and an opening of the U-shaped groove faces away from the hinge. The elastic member provides power for the positioning of the fixing block or the screw connecting the fixing block to the adjustment shaft in the U-shaped groove. When to adjust the position of the tray, the tray is manually pulled first, and the fixing block or the screw connecting the fixing block to the adjustment shaft is moved to the groove bottom of the U-shaped groove, and then the fixing block or the screw connecting the fixing block to the adjustment shaft is moved to another side of the U-shaped groove, the tray is released, and then under the action of the elastic member, the fixing block or the screw connecting the fixing block to the adjustment shaft is moved to the top end of the other side of the U-shaped groove, thus realizing the adjustment to the position of the tray.

As an optimization, the elastic member is a tension spring, the U-shaped groove is arranged in an axial direction of the adjustment shaft, and an opening of the U-shaped groove faces towards the hinge.

As an optimization, the hinge includes a fixed plate, a movable plate, a rotating shaft, a spring, and an adjusting screw. The fixed plate is arranged on the column, and the fixed plate and the movable plate are connected through the rotating shaft. The rocker arm is connected to the movable plate, and one end of the rotating shaft is provided with an engagement cap, and another end of the rotating shaft is provided with a threaded hole corresponding to the adjusting screw. The rotating shaft passes through the movable plate and the fixed plate to be connected to the adjusting screw. The engagement cap fits closely to the movable plate. The spring is arranged between a screw cap of the adjusting screw and the fixed plate. A shape of a cross section of a portion, located in the fixed plate and/or the movable plate, of the rotating shaft is non-circular, and a shape of through holes in the fixed plate and the movable plate match the non-circular shape.

As an optimization, the shape of the cross section of the portion, located in the fixed plate and/or the movable plate, of the rotating shaft is any one of a rectangular shape, a triangular shape, an arcuate shape, a pentagonal shape, and a hexagonal shape.

As an optimization, the rocker arm further includes an inclined support tube, the inclined support tube has one end connected to the transverse support tube, and another end connected to the column by the hinge, and the inclined support tube, the transverse support tube and the column form a triangle.

As an optimization, the adjustment shaft is made from a nylon material.

As an optimization, the rocker arm further includes an end cover arranged at an end, away from the hinge, of the transverse support tube.

The effects provided in the summary of the present application are merely the effects of the embodiments, rather than all of the effects of the present application, and the above technical solutions have the following advantages or beneficial effects:

1. The support frame has an adjustable angle and has a structure whose damping can be easily adjusted. The support frame can be retracted to a relatively flat position without occupying excess space when it is not in use, and is very suitable for laboratories for performing signal integrity tests, system tests, software tests, power supply tests, etc., and may also be placed in large computer rooms for daily operation and maintenance.

2. By providing the elastic member, power is provided for the positioning of the fixing block or the screw connecting the fixing block to the adjustment shaft in the U-shaped groove.

3. By providing the adjusting screw, the effect of adjusting the rotational damping force of the hinge can be achieved, and by rotating the adjusting screw, the depth by which the adjusting screw is screwed into the rotating shaft can be adjusted, thereby adjusting the compression amount of the spring, and realizing the adjustment to the rotational damping force of the hinge.

4. By providing the inclined support tube, the strength of the rocker arm is increased, and the safety of the tablet device is ensured.

5. By providing the adjustment shaft made from a nylon material, the smoothness of rotation of the adjustment shaft can be achieved by utilizing the self-lubricating property of the adjustment shaft itself.

6. The end cover is provided to realize the sealing of the transverse support tube, to provide the effects of dustproof and moisture-proof.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of protection of the present application.

Figure 1:
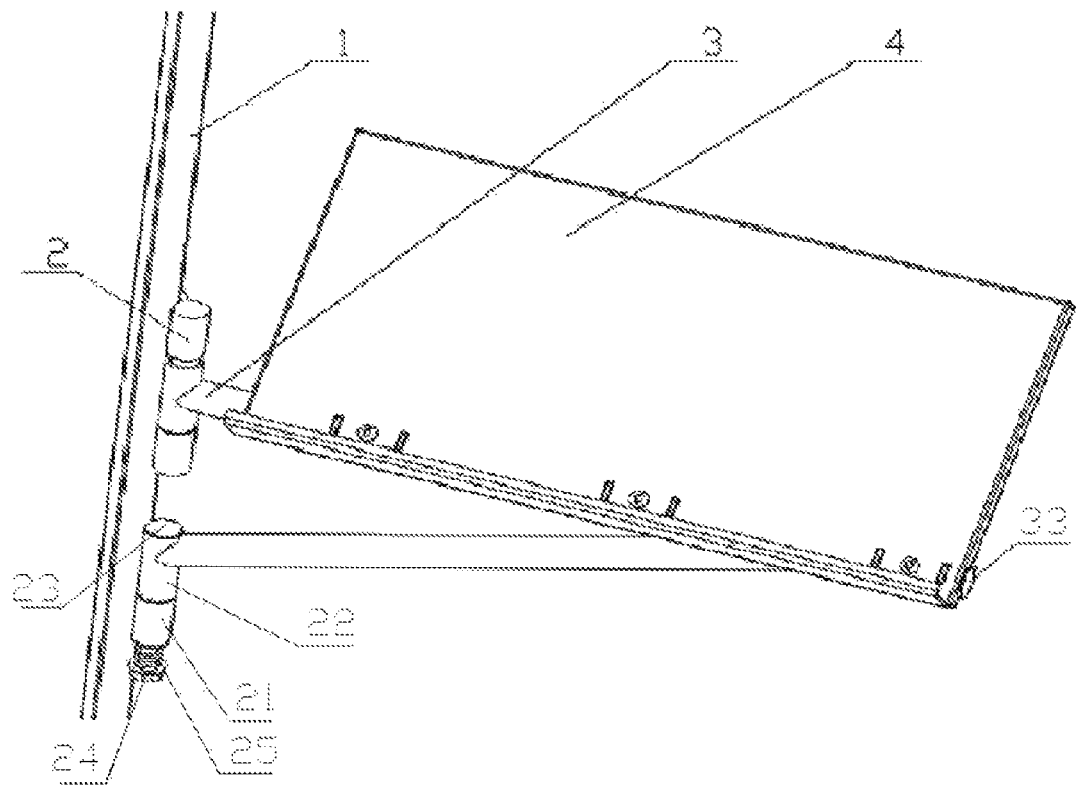
FIG. 1 is a perspective structural view of an embodiment of a support frame according to the present application.
Figure 2:
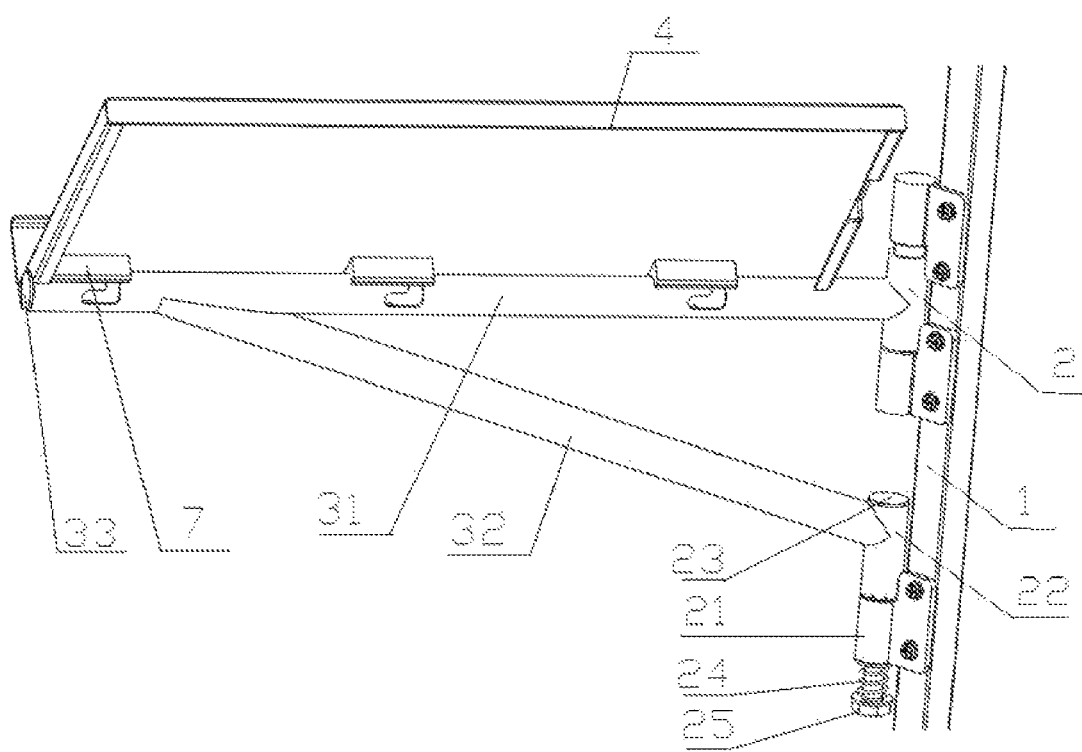
FIG. 2 is a perspective structural view of FIG. 1 viewed from another angle.
Figure 3:
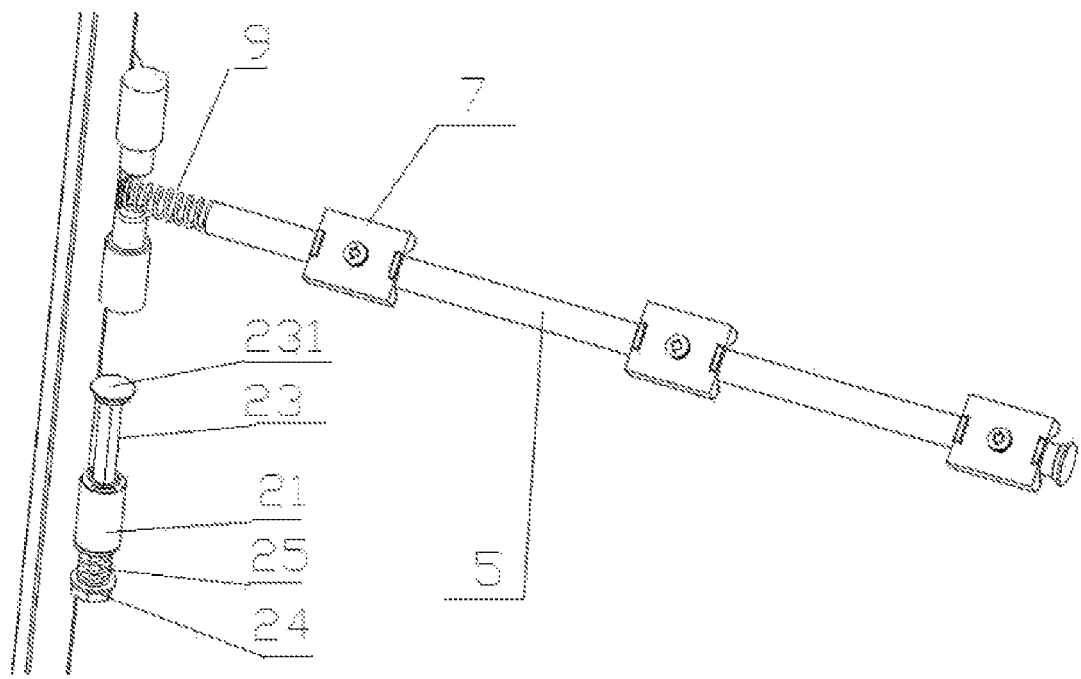
FIG. 3 is an internal structural view of an embodiment of the present application with part of components being hidden.
Figure 4:
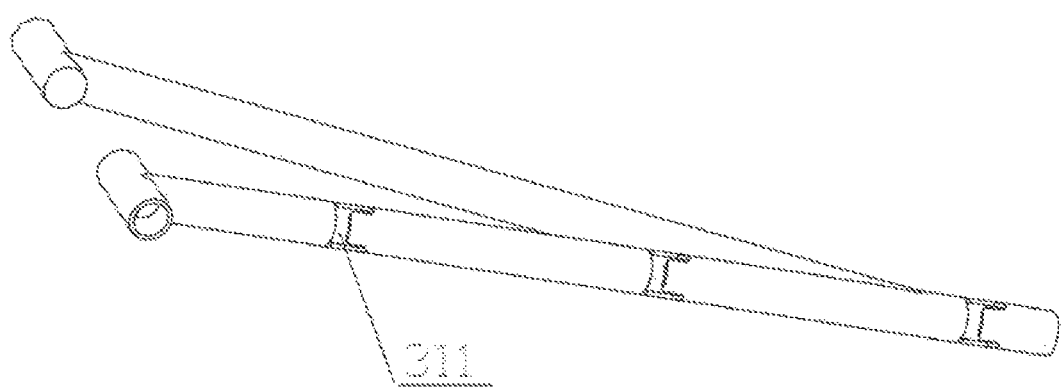
FIG. 4 is an overall structural view of an embodiment of a U-shaped groove in a transverse support tube.

FIGS. 1 to 4 show an embodiment of the present application, as shown in the figures, a support frame includes a column 1, a rocker arm 3, a tray 4, an adjustment shaft 5 and a fixing block 7. The column 1 is vertically arranged, the rocker arm 3 is horizontally arranged, and the column 1 and the rocker arm 3 are connected by a hinge 2. The rocker arm 3 includes a transverse support tube 31, and the transverse support tube 31 is connected to the hinge 2. The transverse support tube 31 is a hollow round tube, and the adjustment shaft 5 is arranged inside the transverse support tube 31. An elastic member 9 is provided at one end of the adjustment shaft 5, and the elastic member 9 has one end connected to the adjustment shaft 5 and another end connected to the column 1 or the hinge 2. The transverse support tube 31 is provided with multiple U-shaped grooves 311, and the fixing block 7 is arranged outside the transverse support tube 31. The fixing block 7 passes through the U-shaped groove 311 to be connected to the adjustment shaft 5; or, a screw is provided, and the tail of the screw may pass through the fixing block 7, the U-shaped groove 311, and then is inserted into the adjustment shaft 5 to connect the fixing block 7 to the adjustment shaft 5. The tray 4 is connected to the fixing block 7. A tablet device such as a laptop can be placed on the tray 4.

The above U-shaped groove includes two approximately parallel side grooves and a bottom groove connecting the two side grooves. For each of the two side grooves, the connection portion of the side groove with the bottom groove is an opening of the side groove, and the end of the side groove that is away from the opening is the bottom of the side groove. The two side grooves of the U-shaped groove of the transverse support tube 31 provide two positions for the tray 4, that is, one position for the situation when the device needs to be placed and another position where the tray 4 is retracted to a relatively flat space for the situation when the device is not placed. By rotating the adjustment shaft 5, the fixing block 7 or the screw connecting the fixing block 7 to the adjustment shaft 5 is engaged in different positions of the U-shaped groove, that is, engaged in different side grooves of the U-shaped groove, thus, the adjustment to the angle of the tray 4 can be realized.

The elastic member 9 is a spring, and the U-shaped groove 311 is arranged in an axial direction of the adjustment shaft 5, and an opening of the U-shaped groove 311 faces away from the hinge 2. The elastic member 9 provides power for the positioning of the fixing block 7 or the screw connecting the fixing block 7 to the adjustment shaft 5 in the U-shaped groove. When to adjust the position of the tray 4, the tray 4 is manually pulled first, and the fixing block 7 or the screw connecting the fixing block 7 to the adjustment shaft 5 is moved from the bottom of one side groove of the U-shaped groove to the groove bottom of the U-shaped groove (i.e., the bottom groove of the U-shaped groove), and then the fixing block 7 or the screw connecting the fixing block 7 to the adjustment shaft 5 is moved to another side of the U-shaped groove, that is, the opening of the other side groove, the tray 4 is released, and then under the action of the elastic member 9, the fixing block 7 or the screw connecting the fixing block 7 to the adjustment shaft 5 is moved to the top end of the other side of the U-shaped groove, that is, the bottom of the other side groove, thus realizing the adjustment to the position of the tray 4.

The hinge 2 includes a fixed plate 21, a movable plate 22, a rotating shaft 23, a spring 24, and an adjusting screw 25. The fixed plate 21 is arranged on the column 1, and the fixed plate 21 and the movable plate 22 are connected by the rotating shaft 23. The rocker arm 3 is connected to the movable plate 22, and one end of the rotating shaft 23 is provided with an engagement cap 231, and another end of the rotating shaft 23 is provided with a threaded hole corresponding to the adjusting screw 25. The rotating shaft 23 passes through the movable plate 22 and the fixed plate 21 and then is connected to the adjusting screw 25. The engagement cap 231 fits closely to the movable plate 22. The spring 24 is arranged between a screw cap of the adjusting screw 25 and the fixed plate 21. The shape of a cross section of a portion, located in the fixed plate 21 and/or the movable plate 22, of the rotating shaft 23 is non-circular, and the shape of the through holes in the fixed plate 21 and the movable plate 22 matches the non-circular shape. By providing the adjusting screw 25, the effect of adjusting the rotational damping force of the hinge 2 can be achieved, and by rotating the adjusting screw 25, the depth by which the adjusting screw 25 is screwed into the rotating shaft 23 can be adjusted, thereby adjusting the compression amount of the spring 24, and realizing the adjustment to the rotational damping force of the hinge 2.

The cross section of the portion, located in the fixed plate 21 and/or the movable plate 22, of the rotating shaft 23 may be any one of a rectangular shape, a triangular shape, an arcuate shape, a pentagonal shape, and a hexagonal shape.

The rocker arm 3 further includes an inclined support tube 32. The inclined support tube 32 has one end connected to the transverse support tube 31, and another end connected to the column 1 through the hinge 2. The inclined support tube 32, the transverse support tube 31 and the column 1 form a triangle. By providing the inclined support tube 32, the strength of the rocker arm 3 is increased, and the safety of the tablet device is ensured.

The adjustment shaft 5 is made from a nylon material. By providing the adjustment shaft 5 made from the nylon material, the smoothness of rotation of the adjustment shaft 5 can be achieved by utilizing the self-lubricating property of the adjustment shaft 5 itself.

The rocker arm 3 further includes an end cover 33. The end cover 33 is arranged at an end, away from the hinge 2, of the transverse support tube 31. The end cover 33 is provided to realize the sealing of the transverse support tube 31, to provide the effects of dustproof and moisture-proof.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A support frame, comprising: a column, a rocker arm, a tray, an adjustment shaft and a fixing block, wherein the column is vertically arranged, the rocker arm is horizontally arranged, and the column and the rocker arm are connected by a hinge; the rocker arm comprises a transverse support tube, the transverse support tube is connected to the hinge, and the transverse support tube is a hollow round tube; the adjustment shaft is arranged inside the transverse support tube, an elastic member is provided at one end of the adjustment shaft, and one end of the elastic member is connected to the adjustment shaft and another end of the elastic member is connected to the column or the hinge; the transverse support tube is provided with a plurality of U-shaped grooves, the fixing block is arranged outside the transverse support tube, and the tray is connected to the fixing block, and the fixing block passes through the U-shaped groove to be connected to the adjustment shaft, or, the support frame further comprises a screw, and the screw is configured to pass through the U-shaped groove, to connect the fixing block to the adjustment shaft.

2. The support frame according to claim 1, wherein the elastic member is a spring, the U-shaped groove is arranged in an axial direction of the adjustment shaft, and an opening of the U-shaped groove faces away from the hinge.

3. The support frame according to claim 1, wherein the elastic member is a tension spring, the U-shaped groove is arranged in an axial direction of the adjustment shaft, and an opening of the U-shaped groove faces towards the hinge.

4. The support frame according to claim 1, wherein the hinge comprises a fixed plate, a movable plate, a rotating shaft, a spring, and an adjusting screw; the fixed plate is arranged on the column, and the fixed plate and the movable plate are connected through the rotating shaft; the rocker arm is connected to the movable plate, and one end of the rotating shaft is provided with an engagement cap, and another end of the rotating shaft is provided with a threaded hole corresponding to the adjusting screw; the rotating shaft passes through the movable plate and the fixed plate to be connected to the adjusting screw, and the engagement cap fits closely to the movable plate; the spring is arranged between a screw cap of the adjusting screw and the fixed plate, a shape of a cross section of a portion, located in the fixed plate and/or the movable plate, of the rotating shaft is non-circular, and a shape of through holes in the fixed plate and the movable plate match the non-circular shape.

5. The support frame according to claim 4, wherein the shape of the cross section of the portion, located in the fixed plate and/or the movable plate, of the rotating shaft is any one of a rectangular shape, a triangular shape, an arcuate shape, a pentagonal shape, and a hexagonal shape.

6. The support frame according to claim 1, wherein the rocker arm further comprises an inclined support tube, the inclined support tube has one end connected to the transverse support tube and another end connected to the column through the hinge, and the inclined support tube, the transverse support tube and the column form a triangle.

7. The support frame according to claim 1, wherein the adjustment shaft is made from a nylon material.

8. The support frame according to claim 1, wherein the rocker arm further comprises an end cover arranged at an end, away from the hinge, of the transverse support tube.

* * * * *